Jan. 9, 1923.
D. C. CORNER.
SHOVELING MACHINE.
FILED APR. 1, 1921.
1,441,216
3 SHEETS-SHEET 1
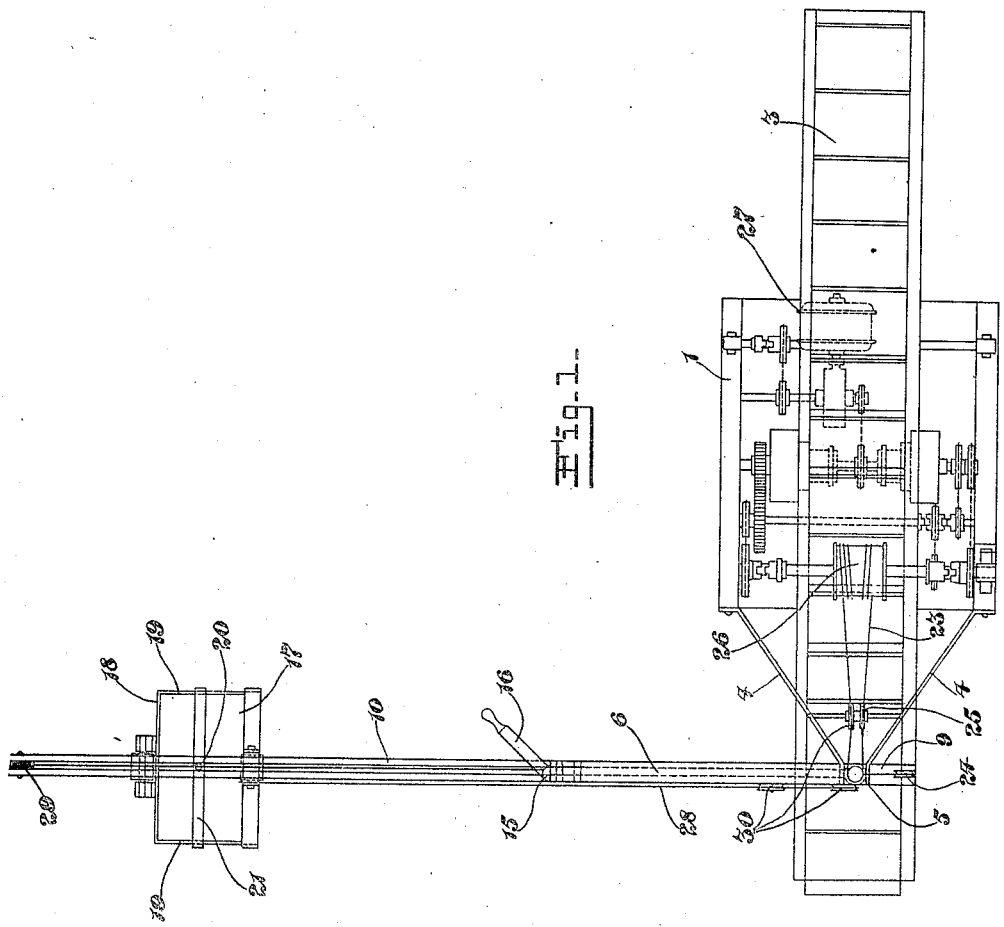
Inventor.
Douglas C. Corner,
by Gypsy & Kingland
His Attorneys.

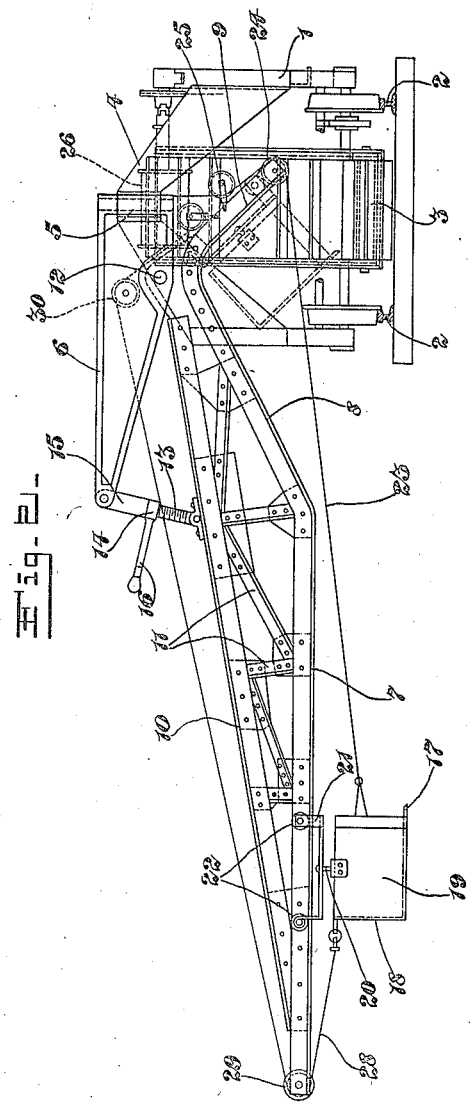

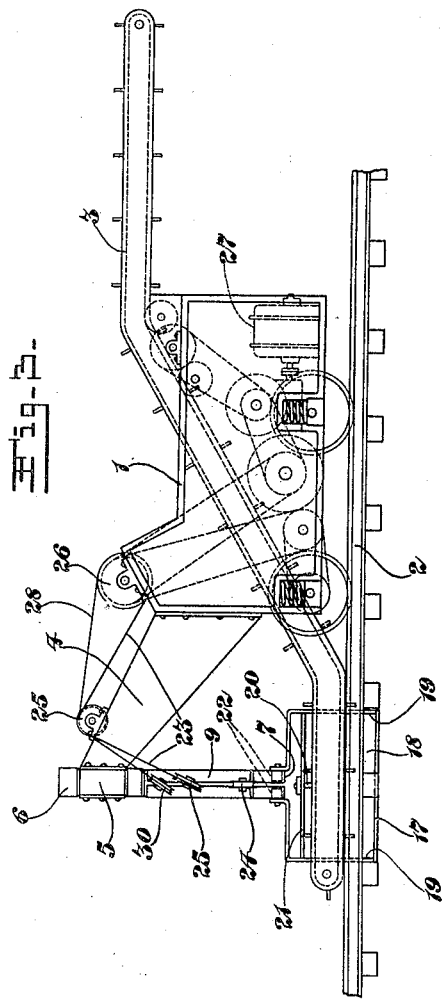

Patented Jan. 9, 1923.

1,441,216

UNITED STATES PATENT OFFICE.

DOUGLAS C. CORNER, OF ST. LOUIS, MISSOURI.

SHOVELING MACHINE.

Application filed April 1, 1921. Serial No. 457,640.

*To all whom it may concern:*

Be it known that I, DOUGLAS C. CORNER, a citizen of the United States, residing at the city of St. Louis and State of Missouri, have invented a new and useful Shoveling Machine, of which the following is a specification.

This invention relates to shoveling machines.

An object of the invention is to provide an improved shoveling machine having a drag or shovel capable of operation for digging and carrying the material toward the machine to place it on a conveyor.

Another object of the invention is to provide an improved shoveling machine including a conveyor for elevating and delivering the material into a car or other receptacle, in combination with a boom capable of swinging laterally to different positions and capable of vertical adjustment, and means for supporting a drag or shovel for operation on the boom as required to dig and carrying the material to the conveyor.

Another object of the invention is to provide a shoveling machine with a drag or shovel capable of operation to dig and to carrying the material to a conveyor, and a boom for supporting the drag or shovel having a construction whereby the drag or shovel will dump its contents upon the conveyor.

Another object of the invention is to provide a machine of the character mentioned with a drag or shovel capable of operation in confined spaces such as room corners and around props and supports, to permit a sweeping movement of the drag or shovel for cleaning up the side portions of the spaces or rooms in which the machine is operated.

Other objects will appear from the following description, reference being made to the accompanying drawings in which Fig. 1 is a plan view of a shoveling machine embodying my present invention.

Fig. 2 is an end elevation of the machine.

Fig. 3 is a side elevation of the machine.

As shown in the drawings the operative mechanism is supported upon a car or truck 1, the wheels of which operate upon rails 2 constituting a track. The conveyor 3 is supported and arranged for operation substantially as shown, said conveyor having its forward or receiving end relatively low so as to receive the material dumped thereon by the drag or shovel. The upper portion of the conveyor moves rearwardly and the rear end of the conveyor is at a sufficient height to permit a mine car or other appropriate vehicular receptacle to pass under the extended rear end of the conveyor, so as to receive the material discharged from the conveyor. The type of conveyor shown is of known construction, arrangement and operation and any appropriate mechanism for operating the conveyor may be employed. The subject-matter of the present invention does not reside in the specific form of conveyor or in the specific form of operative mechanism therefor. My present invention is designed and adapted for use with any appropriate conveyor such as that shown, or any other conveyor capable of use with the invention.

My present invention comprises the boom and the drag or shovel supported thereby, and includes also the relationship of said parts with each other and with the conveyor and the operating mechanism.

In the embodiment shown a support 4 extends from the forward end of the truck 1 and is provided with a bearing portion 5. A boom supporting member 6 has a vertical axis mounted in the bearing 5, thereby supporting the member 6 for swinging movements on said vertical axis.

The boom shown includes a lower member comprising a horizontal portion 7 united with an upwardly inclined portion 8 having a downwardly inclined portion 9 at its inner end. The downwardly inclined portion 9 of the boom is above the lower or receiving portion of the conveyor so that when the drag or shovel passes on the said inclined portion 9 of the boom the drag or shovel is thereby tilted or inclined and caused to dump the contents onto the conveyor. The boom also includes an appropriate reinforcing structure comprising a bar 10 having its outer end attached to the horizontal part 7 of the boom and its intermediate portion connected with the lower portion of the boom by strengthening braces 11. The boom thus constructed is pivoted on a horizontal pivot 12 carried by the boom support 6, thus permitting the outer end of the boom to be raised or lowered, as desired. It will be seen that this construction not only permits the boom to be raised or lowered, but also permits the boom to be swung horizontally around the axis of the pivot supporting the member 6. The boom may be swung to either side or in front of the conveyor and the elevation of the outer end of the boom may be varied as desired, or as required to conform to variations in the level of the ground or of the floor on or above which the drag or shovel is intended to operate. The boom is provided with a threaded element 13 engaging in a threaded revoluble socket 14 carried by an arm 15 at the outer end of the boom support 6. The socket 14 may be turned relative to the arm 15 and caused to operate upon the threaded element 13 as required to raise or to lower the outer end of the boom. A lever 16 in connection with the socket 14 constitutes convenient means for operating said socket.

In the construction shown the drag or shovel comprises a bottom wall 17, an outer end wall 18 and two side walls 19, leaving the receiving side or end of the shovel open so that the bottom wall may pass or scoop under the material which is received between the side walls and retained by the back wall. The shovel is supported on a vertical axis 20 mounted in a frame 21. The frame 21 is supported by rollers 22 arranged to operate upon the upper surfaces of flanges on opposite sides of the boom member 7—8—9. By this it will be understood that the boom member 7—8—9 as shown is of an inverted T-shape; the horizontal flanges constituting a track upon which the rollers 22 operate to carry the drag or shovel throughout the operation thereof. The vertical portion or web of the inverted T-shaped member 7—8—9 is between the pairs of rollers 22, so that lateral displacement of the rollers is impossible; and vertical displacement of the rollers is prevented by the horizontal part supporting the pivot member 20 which is located close enough to the under side of the boom member to limit vertical movement.

It will be seen that the drag or shovel constructed and arranged in the manner shown and described is capable of being turned to operate in any desired direction. It may be turned to scoop laterally or at any desired angle relative to the boom. When the drag or shovel is loaded it is operated on the boom passing upwardly on the inclined portion 8 and onto the downwardly inclined portion 9 to a position such as that indicated by dotted lines in Fig. 2 in which the material will be discharged or dumped from the drag or shovel onto the conveyor. The drag or shovel may be operated in this direction by a rope or cable 23 connected to the forward end of the drag or shovel and passing partially around a sheave or pulley 24 at the inner end of the boom. Other appropriate sheaves or pulleys 25 are provided for the rope or cable 23. The inner end of the rope or cable is connected with a drum 26 which is arranged to be rotated by appropriate connections from the motor or power device 27. After the material has been discharged or dumped onto the conveyor the drag or shovel is returned to the outer portion of the boom for another load. For this purpose a rope or cable 28 is connected to the outer end of the drag or shovel and is arranged to operate upon a sheave or pulley 29 at the outer end of the boom and intermediate sheaves or pulleys 30, and has its inner end also connected with the drum 26. The ropes or cables 23 and 28 are connected with the drum so that when one is wound on the drum the other is unwound, and vice versa. By this arrangement the rope or cable 28 is unwound from the drum when the rope or cable 23 is wound on the drum; and similarly, the rope or cable 23 is unwound from the drum when the rope or cable 28 is wound on the drum.

From the foregoing description it will be seen that my invention is compact as to its vertical dimensions, thus enabling the machine to be operated and used successfully in spaces in which machines of greater vertical height cannot be used. The material is dumped from the drag or shovel without requiring vertical movement of the boom, and this constitutes one of the important advantages and improvements of the machine. In addition, the boom may be supported at different angles of inclination and may be swung laterally to any desired position irrespective of the angle of inclination at which the boom is supported, thus increasing the operating range of the machine over any present underground shoveling apparatus. The shovel is capable of being turned to different positions so as to operate within confined spaces as, for instance, in the corners of rooms, around props, etc. The shovel is also capable of being turned to scoop or receive material when moved laterally. Irrespective of the lateral angle to which the drag or shovel may be turned it will assume its proper position when the rope or cable 23 is tightened to move the drag or shovel to dumping position.

As a result of the foregoing description it will be seen that my invention satisfactorily accomplishes all of its intended purposes and objects. The construction is of a strong, durable and simple nature. It is apparent that the construction and arrangement of the invention and the parts thereof may be varied within the scope of equivalent limits without departure from the nature and principle of the invention.

I do not restrict myself to unessential features, but what I claim and desire to secure by Letters Patent, is:—

1. In a machine of the character described, the combination of a conveyor for conveying the material to a place of delivery, a shovel for digging the material and carrying the material to the conveyor, and a track supporting the shovel and comprising a straight portion extending from the outer end of the boom toward the conveyor and an inclined portion above the conveyor for supporting the shovel in an inclined position to discharge the material onto the conveyor.

2. In a machine of the character described, the combination of a conveyor for elevating the material, a boom supported for lateral swinging movements, means for holding the boom at different angles of inclination, a straight track on the boom, a shovel, means suspending the shovel from said track, means for moving the shovel along the track toward and away from the conveyor, and an inclined track for supporting the shovel in an inclined position above the conveyor.

3. In a machine of the character described, the combination of a conveyor for receiving and conveying the material to a place of delivery, a support above the conveyor, a member pivoted to said support on a vertical axis and arranged to swing laterally over the support, a boom carried by said member, a shovel movable on said boom, and means for moving the shovel as required to load the same and to carry the material above the conveyor.

4. In a machine of the character described, the combination of a conveyor for receiving and conveying the material to a place of delivery, a support above the conveyor, a member pivoted to said support on a vertical axis and arranged to swing laterally over the support, a boom carried by said member, a shovel movable on said boom, means for moving the shovel as required to load the same and to carry the material above the conveyor, and means for tilting the shovel to discharge material therefrom onto the conveyor.

5. In a machine of the character described, the combination of a conveyor for conveying material to a point of discharge, a boom support pivoted on a vertical axis above the conveyor, a boom pivoted on a horizontal axis on said support, means for holding the boom at different angles of inclination, a shovel operatively supported by the boom, and means for moving the shovel as required to dig material and to carry the material above the conveyor.

6. In a machine of the character described, the combination of a conveyor for conveying material to a point of discharge, a boom support pivoted on a vertical axis above the conveyor, a boom pivoted on a horizontal axis on said support, means for holding the boom at different angles of inclination, a shovel operatively supported by the boom, means for moving the shovel as required to dig material and to carry the material above the conveyor, and means for enabling the shovel to assume an inclined position above the conveyor to discharge the material therefrom onto the conveyor.

7. In a machine of the character described, the combination of a conveyor, a boom support pivoted for lateral swinging movements above the conveyor, a boom pivotally supported by said support, means for supporting the boom at different angles of inclination or in a horizontal position as desired, a track carried by the boom and including a downwardly inclined portion above the conveyor, a shovel operatively supported by said track, and means for moving the shovel in loading and onto the inclined portion of said track to cause the material to discharge onto the conveyor.

8. In a machine of the character described, the combination of a conveyor, a boom supported above the conveyor, a track on the boom including an upwardly inclined portion laterally from the conveyor and a downwardly inclined portion above the conveyor, and a shovel operatively supported from said track and being controlled by the downwardly inclined portion thereof to permit the contents of the shovel to discharge onto the conveyor.

9. In a machine of the character described, the combination of a conveyor, a boom supported above the conveyor, a track on the boom, a frame suspended from said track and being movable thereon to a position above the conveyor, and a shovel having a swivel connection with said frame whereby said shovel may be turned to receive material from different directions.

10. In a machine of the character described, the combination of a conveyor, a boom supported above the conveyor, a track on the boom, a frame suspended from said track and being movable thereon to a position above the conveyor, a shovel having a swivel connection with said frame whereby said shovel may be turned to receive material from different directions, and means for moving the shovel along the track to an inclined position above the conveyor.

11. In a machine of the character described, the combination of a conveyor for receiving and conveying the material to a place of delivery, a shovel for digging the material and moving the material to the conveyor, and a boom supported for horizontal swinging movements, a track carried by the boom for supporting the shovel, and a head block supported by the boom for returning the shovel to its digging position.

12. In a machine of the character described, the combination of a conveyor for conveying the material to a place of delivery, a boom supported for lateral swinging movements about an axis above the conveyor, a shovel supported by the boom for digging and moving the material to the conveyor, and means for moving and guiding the shovel in any of the positions of the boom.

13. In a machine of the character described, the combination of a conveyor for conveying the material to a place of delivery, a boom supported for lateral swinging movements on a vertical axis above the conveyor, a shovel supported by the boom for digging and moving the material to the conveyor, means for guiding the shovel along the conveyor, and means for moving the shovel as required to dig the material and to move the material to the conveyor.

14. In a machine of the character described, the combination of a conveyor for conveying the material to a place of delivery, a boom supported for lateral swinging movements on a vertical axis above the conveyor, a shovel supported by the boom for digging and moving the material to the conveyor, means for guiding the shovel along the conveyor, means for moving the shovel as required to dig the material and to move the material to the conveyor, and means for causing the shovel to discharge the material onto the conveyor.

DOUGLAS C. CORNER.